Patented Feb. 12, 1924.

1,483,411

UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS OF AMMONIA SYNTHESIS AND MEANS FOR EFFECTING THE SAME.

No Drawing. Application filed March 24, 1921. Serial No. 455,352.

*To all whom it may concern:*

Be it known that I, JOHN COLLINS CLANCY, a subject of the King of Great Britain, residing at Providence, in the county of Providence and State of Rhode Island, have invented certain new and useful Improvements in Processes of Ammonia Synthesis and Means for Effecting the Same, of which the following is a specification.

This invention relates to an improvement in the process of ammonia synthesis and more particularly to the provision of an improved drier for the gases to be synthesized and the method of preparing and utilizing the same.

One object of my invention is the provision of an improved drier of the character described which may be readily and economically prepared, and which is extremely efficient in purifying the gases to be synthesized.

Another object of the invention is to provide an efficient material for the purpose specified which is capable of reacting with the impurities contained in the gases to be synthesized with the formation of a substance or substances which are capable of acting as regenerating agents upon the catalyst employed.

Another object of my invention concerns the improvement of the synthetic production of ammonia generally by the production of combined drying and regenerative actions occasioned in cycle by reason of the arrangement of the materials and the novel combination of steps employed in ammonia synthesis.

Other objects and advantages of the invention have to do with the method of preparing the improved drying agent, and certain novel details of operation as will be more fully set forth in the detailed description to follow.

In the process of ammonia synthesis, as effected by use of a catalytic agent, the gases to be synthesized, comprising nitrogen and hydrogen in proportions to combine with the formation of ammonia, are first caused to traverse a chamber or series of chambers containing one or more purifying agents adapted to remove substances liable to deleteriously affect the catalyst. This step in the synthetic process is rendered necessary by reason of the fact that it is impossible to produce absolutely pure nitrogen and hydrogen upon a commercial scale except at a price which would prohibit the commercial use of the same. Among the principal impurities contained in these gases which injuriously affect catalysts containing an alkali or alkali earth metal cyanid or cyanamid are oxygen and water.

In the elimination of these impurities it is advisable to employ two or more purifying agents since substances capable of completely removing one of these impurities are not generally capable of fully and completely freeing the combined gases from the other.

After thus purifying the gases to be synthesized they are conducted into contact with a catalyst such for example as a specially prepared material containing an alkali or alkali earth metal cyanid or cyanamid, under suitable conditions of temperature and pressure to most efficiently synthesize the gases to form ammonia. The catalytic material is preferably positioned in a working autoclave to facilitate the maintenance of proper conditions of temperature and pressure. While the conditions of temperature and pressure vary somewhat dependent upon the particular catalyst employed, they preferably range between 300° and 600° C. with pressures of from 100 to 1000 atmospheres. From the working autoclave the gases may be suitably treated to remove a part or all of the ammonia formed during the synthesizing operation, but I may prefer, in the present instance, to permit traces of the ammonia formed to remain in the residual uncombined gases for a purpose which will be hereinafter more fully described. The unsynthesized gases are then reconveyed to the system to be mixed with the initially received nitrogen-hydrogen mixture and again passed through the purifying agents and into contact with the catalyst for further synthesis.

In the synthesis of ammonia I have found that a metallic carbide may be used advantageously as a drier for eliminating from the mixture of nitrogen and hydrogen gases the traces of moisture present in these gases which are adapted to injuriously affect the catalyst. As illustrative of the compound employed calcium carbide may be mentioned as the best example of a class of metallic carbides which absorb moisture, liberating acetylene gas. As previously stated two or more purifying agents may be employed through which, the gases to be synthesized are passed prior to the synthetic operation, and I prefer, under certain circumstances, to use as one of the other purifying agents an alkalinous metal oxid, such for example as the oxid of sodium or calcium, commonly known as soda lime and lime respectively. When one of these substances is used as a purifying agent I prefer to so position the same relative to the path of travel of the gases to be synthesized that the gases will pass through the alkalinous metal oxid after being brought into contact with the metallic carbide mentioned and before entering the operating autoclave for synthesis.

One reason why I may wish to use an alkalinous metal oxid as a purifying agent and pass the gases to be synthesized therethrough after they have been brought into contact with a metallic carbide as above described is due to the fact that certain of the metallic carbides adapted for use in this connection, such, for example, as calcium carbide, ordinarily contain certain impurities such as sulfur, arsenic, phosphorus and the like, adapted to pass off either in their free state or in combination with one of the gases to be synthesized, and if not removed from the gaseous mixture to injuriously affect the catalyst. These substances or the compounds formed therewith during contact of the nitrogen-hydrogen mixture with the carbide are removed by the alkalinous metal oxids mentioned, thus making it possible to use the metallic carbide without first treating the same to remove the impurities mentioned. However, I prefer to first treat the metallic carbide for the purpose of removing these deleterious substances, in which case it is not necessary to pass the gaseous mixture through an alkalinous metal oxid such as $Na_2O$ or $CaO$ unless this further treatment is necessary to remove free oxygen from the gases or when traces of the above mentioned impurities (such as sulfur, arsenic and phosphorus) are present in the gases themselves.

In the purification of the carbide, I preferably pulverize the carbide to be used, such for example as calcium carbide to the size of small peas and subject the same to the action of hydrogen gas, or a gas containing hydrogen, at a high temperature preferably between 800° and 1000° C. This treatment removes the sulfur, arsenic, phosphorus and such like impurities by forming hydrogen compounds of the corresponding impurities which pass off as gases. The treatment is continued for a sufficient time to remove substantially all of the substances mentioned, and when the readily detectable hydrogen compounds of these substances are no longer present in the gases driven off, the purified carbide is ready for use as a drier.

I have also discovered that when the nitrogen-hydrogen mixture of gases to be synthesized are passed into contact with a metallic carbide of the character described to eliminate moisture from the gases with evolution of acetylene, the acetylene formed is capable of reacting upon an alkali or alkali earth metal carbonate in the presence of ammonia to form a carbon-nitrogen salt of said metal such as a cyanid or cyanamid or a mixture of such salts. The importance of this discovery will be readily appreciated in view of the fact that among the catalysts employed in ammonia synthesis are those containing a cyanid or cyanamid of an alkali or alkali earth metal which substances eventually become "spent or fatigued" after considerable use, probably by reason of the impossibility of entirely eliminating impurities such as oxygen and moisture from the gases to be synthesized before bringing them into contact with the catalyst, thus causing the said impurities to react with the catalytic material with the formation of the corresponding carbonates.

It is my purpose to utilize the above mentioned reaction to regenerate the catalysts employed in ammonia synthesis in conjunction with the utilization of a metallic carbide of the character described for eliminating moisture from the gases to be synthesized, and I propose to accomplish this by using a metallic carbide of the character above described as one of the drying or purifying agents for the gases to be synthesized. If the unpurified carbide is used I prefer to pass the gases into contact with an alkalinous metal oxid after they have been passed through the carbide, but if the carbide has first been purified in the manner above described the gases may or may not be passed into contact with this or some other additional purifying agent after they have been passed through the metallic carbide and before they are brought into contact with the catalyst.

As the gases to be synthesized come from the metallic carbide they carry with them a minute quantity of acetylene gas resulting from the reaction of the carbide with moisture originally contained in the gaseous mixture. As the acetylene gas requires the presence of ammonia to properly react in the regeneration of the catalyst, the presence of ammonia may be effected for this purpose in either of the following ways:—

The gases to be synthesized may be conducted to the autoclave containing the catalyst and during the initial portion of their passage therethrough ammonia will be formed by catalytic action, this ammonia will be present with the traces of acetylene to react upon the spent portions of the catalyst further along in the autoclave to regenerate the same, and thus during the continuation of the process the regenerative action will extend to all portions of the catalyst.

The second method depends upon the mode of operation usually employed in ammonia synthesis wherein the gases after passing into contact with the catalyst are treated to remove the major portion of the ammonia formed and are returned to the circulatory system to again traverse the autoclave for further synthesis. These gases may or may not be caused to again pass through the purifying agents depending upon whether or not moisture or other impurities have been taken up during the step of removing the ammonia. In either case traces of ammonia will be present in the gases as they enter the autoclave which will enable the acetylene to react with the spent portions of the catalyst to regenerate the same.

Only extremely minute quantities of acetylene are formed in passing the gases to be synthesized through the metallic carbide as traces only of moisture are present in the gases, but in the continuation of the synthesis the quantity of acetylene will be sufficient to counteract or substantially counteract the conversion of the cyanid or cyanamid compounds of the catalyst to corresponding carbonates thus prolonging many times the effective life of the catalyst, and making it unnecessary to frequently prepare new catalytic material or discontinue the synthesis of ammonia to place a fresh catalyst in the autoclave.

While I have found that calcium carbide and barium carbide are particularly advantageous for use as drying agents in the process above described I employ the term metallic carbide throughout the specification and claims as covering these and other metallic carbides of this general character which are capable of reacting with water to give off acetylene gas.

It is desirable in the operation of the process as above described that an excess of ammonia be present with the acetylene gas and this will naturally result as normally only very minute traces of acetylene are formed in eliminating the moisture from the gases to be synthesized. The reaction of the acetylene with the alkali or alkali earth metal carbonates to form a corresponding cyanogen compound of those metals is greatly facilitated by pressure, which fact particularly favors the practical operation of my process since high pressures also facilitate the activation of the catalyst in the ammonia synthesis. In fact the conditions of temperature and pressure normally employed in the process of ammonia synthesis serve to effectively promote the regeneration of the catalyst by means of the acetylene gas evolved.

As will be understood from the above description, the gases to be synthesized together with the gaseous hydrocarbon evolved by the reaction effected between the moisture content of the gases and the metallic carbide enter the autoclave together and simultaneously effect under appropriate conditions of temperature and pressure the synthesis of ammonia and the regeneration of spent portions of the catalyst.

The term "alkalinous metal" as used in the specification and claims is employed generically to designate an alkali or alkali earth metal, the term being intended to cover broadly all elements ordinarily classified under the head of alkali metals or alkali earth metals.

It will be apparent from the above description that my improved process comprises broadly an improved cycle of operations wherein the substances evolved in certain steps of the process may be utilized in the effectuation or continuance of other steps in the process, the cyclic operation being capable of being prolonged practically indefinitely so long as a sufficient quantity of initially prepared gases are regularly supplied to the system.

While I have described my improved process with considerable particularity in order to make the mode of operation and the preferred sequence of steps and combinations of steps clear to those skilled in the art, it is to be understood that I do not desire or intend to be limited to the precise combination or sequence of steps described except as the same may be included within the following claims when broadly construed in the light of my disclosure.

Having described my invention, what I claim is:

1. In a process for synthesizing ammonia from its elements the step which comprises passing the gases to be synthesized into contact with a metallic carbide to remove moisture therefrom with the formation of acetylene preparatory to synthesizing ammonia from said gases.

2. In a process for synthesizing ammonia from its elements the steps comprising passing the gases to be synthesized into contact with a metallic carbide to remove moisture therefrom, and then passing said gases into contact with an alkalinous oxid for removing other impurities therefrom preparatory to synthesizing ammonia from said gases.

3. In a process for synthesizing ammonia from its elements the steps comprising passing the gases to be synthesized into contact with a metallic carbide to remove moisture therefrom, and then passing said gases into contact with another purifying agent to remove oxygen therefrom preparatory to synthesizing ammonia, from said gases.

4. In a process for synthesizing ammonia from its elements the steps comprising passing the gases to be synthesized, together with small quantities of ammonia vapor, into contact with a metallic carbide and then passing the gases thus treated into contact with a catalyst containing a metal, carbon and nitrogen to regenerate the catalyst and synthesize ammonia from the gases.

5. In a process for synthesizing ammonia from its elements the steps comprising passing the gases to be synthesized into contact with a metallic carbide to remove water vapor with the formation of a gaseous hydrocarbon, and passing the gaseous hydrocarbon thus formed into contact with a carbonate of an alkalinous metal in the presence of ammonia to form a carbon-nitrogen compound of said metal.

6. In a process for synthesizing ammonia from its elements by means of a catalyst containing a carbon-nitrogen compound of an alkalinous metal the steps comprising passing the gases to be synthesized into contact with a metallic carbide to eliminate moisture therefrom, and then passing the gaseous products thus obtained into contact with the catalyst in the presence of ammonia to regenerate the catalyst.

7. In a process for synthesizing ammonia from its elements by means of a catalyst containing a cyanamid compound of an alkalinous metal the steps comprising passing the gases to be synthesized into contact with a metallic carbide to eliminate moisture therefrom, and passing the gases thus obtained into contact with the catalyst to effect the synthesis of ammonia with simultaneous regeneration of the catalytic material.

8. In a process for synthesizing ammonia from its elements the steps comprising the purification of the gases to be synthesized with formation of a gaseous hydrocarbon, and passing the gaseous hydrocarbon into contact with a carbonate of an alkalinous metal in the presence of ammonia to form a catalytically active carbon-nitrogen compound of said metal.

9. In a process for synthesizing ammonia from its elements by means of a catalyst the steps comprising, purifying the gases to be synthesized with the formation of a gaseous hydrocarbon and passing the gaseous hydrocarbon thus formed into contact with spent portions of the catalyst to regenerate the same.

10. In a process for synthesizing ammonia from its elements by means of a catalyst the steps comprising purifying the gases to be synthesized with the formation of a gaseous hydrocarbon, and passing the gaseous hydrocarbon thus formed into contact with spent portions of the catalyst in the presence of ammonia to regenerate the same.

11. In a process for synthesizing ammonia from its elements by means of a catalyst the steps comprising purifying the gases to be synthesized with the formation of a gaseous hydrocarbon, and passing the gaseous mixture thus obtained into contact with the catalyst to synthesize ammonia therefrom and simultaneously effect the regeneration of spent portions of the catalyst.

12. In a process for synthesizing ammonia from its elements by means of a catalyst the steps comprising purifying the gases to be synthesized, synthesizing ammonia from the gases, and passing gaseous products obtained from purifying the gases together with ammonia into contact with the catalyst to regenerate spent portions of the catalyst.

13. In a process for synthesizing ammonia from its elements by means of a catalyst the steps comprising purifying the gases to be synthesized, and passing the gaseous products obtained from purifying the gases into contact with the catalyst to effect the regeneration of the catalyst simultaneously with the synthesis of ammonia from said gases.

14. In a process for synthesizing ammonia from its elements by means of a catalyst the steps comprising purifying the gases to be synthesized by passing the gases into contact with a metallic carbide to remove moisture therefrom with evolution of acetylene, and passing the mixture of gases to be synthesized and acetylene into contact with the catalyst to effect the regeneration of spent portions of the catalyst simultaneously with the synthesis of ammonia from said gases.

15. In a process for synthesizing ammonia from its elements by means of a catalyst the steps comprising purifying the gases to be synthesized with the formation of a gaseous hydrocarbon, and passing the gaseous hydrocarbon thus formed into contact with spent portions of the catalyst under pressure and at an elevated temperature to regenerate the catalyst.

16. In a process for synthesizing ammonia from its elements by means of a catalyst the steps comprising purifying the gases to be synthesized with the formation of a gaseous hydrocarbon, and passing the gaseous hydrocarbon thus formed into contact with spent portions of the catalyst in the presence of ammonia under pressure and at an elevated temperature to regenerate the catalyst.

17. In a process for synthesizing ammonia from its elements by means of a catalyst containing a carbon-nitrogen compound of an alkalinous metal the steps comprising passing the gases to be synthesized into contact with a metallic carbide to eliminate moisture therefrom with formation of acetylene gas, and then passing the acetylene gas thus obtained into contact with the catalyst in the presence of ammonia, under pressure and at an elevated temperature to regenerate the catalyst.

18. In a process for synthesizing ammonia from its elements by means of a catalyst containing a cyanogen compound of an alkalinous metal the steps comprising passing the gases to be synthesized into contact with a metallic carbide to eliminate moisture therefrom with formation of a gaseous hydrocarbon and then passing the gaseous hydrocarbon thus obtained into contact with the catalyst in the presence of ammonia under pressure and at an elevated temperature to regenerate the catalyst.

19. In a process for synthesizing ammonia from its elements by means of a catalyst the steps comprising purifying the gases to be synthesized with the formation of a gaseous hydrocarbon, and passing the gaseous hydrocarbon thus formed into contact with spent portions of the catalyst in the presence of ammonia under pressure and at an elevated temperature to regenerate spent portions of the catalyst.

In testimony whereof I have affixed my signature.

JOHN COLLINS CLANCY.